(12) United States Patent
Kerai

(10) Patent No.: US 9,160,400 B2
(45) Date of Patent: Oct. 13, 2015

(54) CONDITIONAL SCANNING

(75) Inventor: Kanji Kerai, London (GB)

(73) Assignee: Nokia Technologies Oy, Espoo (FI)

( * ) Notice: Subject to any disclaimer, the term of this patent is extended or adjusted under 35 U.S.C. 154(b) by 2030 days.

(21) Appl. No.: 11/658,463

(22) PCT Filed: Nov. 8, 2004

(86) PCT No.: PCT/GB2004/004717
§ 371 (c)(1),
(2), (4) Date: Sep. 12, 2008

(87) PCT Pub. No.: WO2006/013310
PCT Pub. Date: Feb. 9, 2006

(65) Prior Publication Data
US 2009/0046763 A1    Feb. 19, 2009

(51) Int. Cl.
H04B 1/713     (2011.01)
H04W 84/18    (2009.01)
H04W 56/00    (2009.01)

(52) U.S. Cl.
CPC .............. *H04B 1/713* (2013.01); *H04W 56/00* (2013.01); *H04W 84/18* (2013.01)

(58) Field of Classification Search
USPC .......... 375/132, 133, 135, 136; 370/336, 338, 370/468, 334, 465, 392; 455/41.2, 41.3, 455/434, 426
See application file for complete search history.

(56) References Cited

U.S. PATENT DOCUMENTS

| | | | | |
|---|---|---|---|---|
| 4,388,723 A * | 6/1983 | Keen | | 375/136 |
| 5,471,503 A * | 11/1995 | Altmaier et al. | | 375/133 |
| 5,872,518 A * | 2/1999 | Kushita | | 340/2.1 |
| 6,292,508 B1 * | 9/2001 | Hong et al. | | 375/134 |
| 6,366,622 B1 * | 4/2002 | Brown et al. | | 375/322 |
| 6,377,609 B1 * | 4/2002 | Brennan, Jr. | | 375/133 |
| 6,718,395 B1 * | 4/2004 | Ziegler | | 709/248 |
| 7,729,317 B2 * | 6/2010 | Payne et al. | | 370/334 |
| 2003/0050104 A1 * | 3/2003 | Matsumura et al. | | 455/574 |
| 2004/0042541 A1 * | 3/2004 | Matsumura | | 375/219 |
| 2004/0069852 A1 * | 4/2004 | Seppinen et al. | | 235/451 |
| 2005/0083902 A1 * | 4/2005 | Hashimoto | | 370/349 |
| 2005/0117530 A1 * | 6/2005 | Abraham et al. | | 370/310 |
| 2005/0169201 A1 * | 8/2005 | Huylebroeck | | 370/311 |
| 2005/0190700 A1 * | 9/2005 | Melpignano | | 370/244 |
| 2005/0220135 A1 * | 10/2005 | Honda et al. | | 370/437 |
| 2011/0032882 A1 * | 2/2011 | Zechlin et al. | | 370/329 |

FOREIGN PATENT DOCUMENTS

EP    1 333 618 A2    8/2003
EP    1333618 B1 *   8/2007

OTHER PUBLICATIONS

Blue Tooth Specification, vols. 0, 1, 2, and 3, Version 1.2, Nov. 5, 2003.*
Baatz, S. et al., "Bluetooth scatternets: an enhanced adaptive scheduling scheme", Jun. 23-27, 2002, Proceedings IEEE Infocom 2002, pp. 782-790.

* cited by examiner

*Primary Examiner* — Faruk Hamza
*Assistant Examiner* — Cassandra Decker
(74) *Attorney, Agent, or Firm* — Harrington & Smith

(57) ABSTRACT

A method of controlling a low power radio receiver including controlling the radio receiver for a first, relatively short, period of time to detect radio transmissions in a predetermined frequency band, and determining whether to control the radio receiver for a subsequent second relatively longer period of time to receive data from a subsequent radio transmission in the predetermined frequency band.

28 Claims, 2 Drawing Sheets

CONDITIONAL SCANNING

FIELD OF THE INVENTION

Embodiments of the present invention relate to conditional scanning. In particular, they relate to a conditional page scan and/or a conditional inquiry scan.

BACKGROUND TO THE INVENTION

FIG. 1 illustrates a piconet 2 which is an ad-hoc wireless network of Bluetooth devices 4 that can communicate with each other using radio packets. The piconet 2 has a hub and spoke topology and is controlled by a Master device 4A at the hub with radio links 6 forming the spokes. Up to seven slave devices 4B can be located on seven respective spokes. Only one device in the piconet 2 transmits at a time. Each Slave device 4B can only communicate with the Master device 4A and the Master device 4A can communicate with any of the Slaves 4B.

The radio links 6 are formed using low power radio frequency transmissions in the 2.4 GHz ISM band. The radio links 6 use fast frequency-hopping spread-spectrum (FHSS) technique. The frequency hops at 1600 hops/s in a pseudo-random fashion over 79 one MHz channels.

The communication channel used in the piconet 2 is a Time-Division Duplex radio channel. The channel is divided into a sequential series of slots of 625 µs duration. The Master 4A starts transmission in even numbered slots while the Slaves 4B transmit in odd numbered slots. A transmission is typically a single packet that occupies a single slot. However, in certain circumstances the packet may occupy 3 or 5 slots.

The frequency at which a packet is transmitted is determined by the piconet's frequency-hopping sequence and the phase within the sequence at the time of transmission. The piconet's frequency-hopping sequence is derived from the Bluetooth Device Address of the Master device 4A. The phase within the frequency-hopping sequence is determined by the Bluetooth Clock of the Master device 4A. The frequency hops every 625 µs i.e. every slot.

The radio packets transmitted within the piconet 2 use, as a preamble, an Access Code that is dependent upon the Bluetooth Device Address of the Master device 4A.

It will therefore be appreciated that for a connectable device 4C to join a piconet 2 it must first receive an indication of the Bluetooth Device Address of the Master device 4A and an indication of the Bluetooth Clock value of the Master Device 4A. The Bluetooth Clock value enables the connectable device 4C to synchronize its timing and frequency hopping to that of the piconet 2. The Bluetooth Address enables the connectable device, when it joins the piconet 2, to send packets with the correct Access Code, to use the correct frequency-hopping sequence for the piconet 2 and to detect the arrival of transmitted packets from the Master 4A and thereby maintain time and frequency synchronization with the piconet 2. The Bluetooth Address and Bluetooth Clock value of the Master device 4A are sent to a connectable device 4C during a paging procedure.

The paging procedure for forming connections is asymmetrical and requires that one Bluetooth device carries out the page (connection) procedure while the other Bluetooth device is connectable (page scanning). The procedure is targeted so that the page procedure is only responded to by one specified Bluetooth device.

The connectable device (e.g. 4C) uses a special slow frequency hopping physical channel to listen for connection request packets from the paging device (e.g. 4A) which uses a fast frequency hopping channel. This slow frequency hopping physical channel has attributes that are specific to the connectable device 4C, hence only a paging device 4A with knowledge of the connectable device 4C is able to communicate on this channel.

In the paging procedure, the paging device 4A transmits a paging request for a target connectable device 4C that is to be joined to the piconet as a Slave device to the Master paging device. Each paging request is a packet that has as its preamble an Access Code that is dependent upon the Bluetooth Device Address of the target connectable device 4C. The frequency at which the packet is transmitted is determined from a page frequency-hopping sequence and the phase within the sequence. The page frequency-hopping sequence is a sequence of 32 frequencies derived from the Bluetooth Device Address of the target connectable device 4C. The phase within the sequence at the time of transmission is determined from an estimate of the Bluetooth Clock of the target connectable device 4C as emulated in the paging device 4A. As the paging device 4A can only estimate the Bluetooth clock value of the connectable device 4C, the paging device 4A transmits a series of paging requests each at a different frequency taken from a train A of the 16 most probable frequencies within the page frequency-hopping sequence. Each paging request is an ID packet of size 68 bits (68 us duration). Two paging requests, at successive frequencies in the train A, are transmitted in each even numbered slot. Thus a train of 16 paging requests is transmitted over 10 ms. The train is then repeated 128 or 256 times. If no reply is received paging requests are repeatedly transmitted using the remaining train B of 16 frequencies from the page frequency-hopping sequence.

Each connectable Bluetooth device, that is one that is available to join a piconet, periodically enters a page scan state in which it scans for paging requests transmitted for it. During a scan a sliding correlator correlates against the expected Access code and triggers when a threshold is exceeded.

In the page scan state, the Access Code used is derived from the Bluetooth Address of the connectable device.

The Bluetooth Specification requires a page scan to be performed every 1.28 s or 2.56 s. The page scan lasts between 11.25 and 2560 ms. During page scanning, the receiver of the connectable device 4C attempts sequentially to receive at each one of the frequencies of the page frequency-hopping sequence frequency. The phase within the sequence is determined by the Bluetooth Clock of the connectable device 4C. The receiving frequency typically changes every 1.28 s.

The frequency at which a connectable device 4C receives a page request allows the connectable device to roughly synchronize in time and frequency with the paging device. The correlation with the Access code of the paging request provides time synchronization. The connectable device 4C transmits a reply to the paging device 4A a predetermined time after receiving the page request and at a frequency related to the frequency of the received page request. The connectable device's receiver is then activated a predetermined time later to receive an FHS packet from the paging device 4A, which allows the connectable device 4C to join the piconet 2 as a Slave. The FHS packet comprises the Bluetooth Address of the Master device 4A and the Bluetooth Clock value of the Master device 4A.

It is apparent that if the paging device 4A is to page a connectable device 4C, then it typically requires the Bluetooth Device Address of that device and (optionally) the Bluetooth Clock value of that device. The Bluetooth Device Address enables the paging device 4A to send packets with the correct Access Code and to use the correct frequency-hopping sequence. The Bluetooth Clock value enables the paging device 4A to emulate the timing in the target connectable device 4C and accurately estimate the most probably frequency currently being used by the connectable device 4C in page scan mode.

An Inquiry procedure is typically used by a device to obtain the Bluetooth Clock values and Bluetooth Device Addresses of the connectable Bluetooth devices that are within range. It is an asymmetrical procedure that uses a special physical channel. The procedure is not targeted so that the inquiry procedure is responded to by all connectable Bluetooth devices within range.

The connectable device (e.g. 4C) uses a special slow frequency hopping physical channel to listen for inquiry packets from an inquiring device (e.g. 4A) which uses a fast frequency hopping channel to transmit the inquiry packets. This special slow frequency hopping physical channel has independent attributes that are not specific to the inquiring device 4A or the connectable device 4C.

In the inquiry procedure, the inquiring device 4C continually broadcasts an inquiry packet at different hop frequencies. Each inquiry packet has as its preamble an Inquiry Access Code. The frequency at which the packet is transmitted is determined from an inquiry frequency-hopping sequence and the phase within the sequence at the time of transmission. The inquiry frequency-hopping sequence is derived from the Inquiry Access Code. The phase within the sequence at the time of transmission is determined from the Bluetooth Clock of the inquiring device 4A. The inquiry frequency-hopping sequence of 32 frequencies is divided into two trains A & B of 16 frequencies. The inquiring device 4A initially transmits a series of inquiry packets each at a different frequency taken from the train A. Each inquiry packet is an ID packet of size 68 bits (68 μs duration). Two inquiry packets, at successive frequencies in the train A, are transmitted in each even numbered slot. Thus a train of 16 inquiry packets is transmitted over 10 ms. The train is then repeated at least 256 times. Then inquiry packets are repeatedly transmitted using the remaining train B of 16 frequencies from the inquiry frequency-hopping sequence.

Each connectable Bluetooth device that is available to join a piconet 2 periodically enters an inquiry scan state in which it scans for inquiry packets. During a scan a sliding correlator correlates against the expected Access code and triggers when a threshold is exceeded. In the inquiry scan state, the Access Code used is derived from the Inquiry Access Code.

The Bluetooth Specification requires an inquiry scan to be performed every 1.28 s or 2.56 s. The inquiry scan lasts between 11.25 and 2560 ms. During the inquiry scan, the receiver of the Bluetooth device attempts sequentially to receive at each one of the frequencies of the inquiry frequency-hopping sequence. The phase within the sequence is determined by the Bluetooth Clock of the connectable device. The receiving frequency typically changes every 1.28 s.

If a connectable device 4C receives an inquiry packet during the inquiry scan it will respond in an odd numbered time slot, by transmitting a FHS packet which has the Inquiry Access Code as its Access code and has, in its payload, the Bluetooth Device Address and Bluetooth Clock value of the connectable device 4C.

An important consideration for Bluetooth devices is power consumption. Typically, a Bluetooth device reduces power consumption by remaining in a low power consumption idle state from which it awakes periodically to enter the page scan state and/or to enter the inquiry scan state in which power is consumed.

It would be desirable to further reduce power consumption.

BRIEF DESCRIPTION OF THE INVENTION

According to one embodiment of the invention there is provided a method of controlling a radio receiver comprising: controlling the radio receiver for a first, relatively short, period of time to detect radio transmissions in a predetermined frequency band, and determining whether to control the radio receiver for a subsequent second relatively longer period of time to receive data from a subsequent radio transmission in the predetermined frequency band.

There is an additional step of controlling the receiver for a first, relatively short, period of time to detect radio transmissions in a predetermined frequency band. This steps allows the step of controlling the receiver for a subsequent second relatively longer period of time to receive data from a subsequent radio transmission in the predetermined frequency band to be non-mandatory.

Thus a page scan or inquiry scan need only be performed if the radio transmissions detected in the first period of time fulfill one or more predetermined conditions.

In the prior art, the page scan and inquiry scan were used to obtain time and frequency synchronization and to receive data (the Access Code) from the packet received during the scan. In embodiments of the invention, the step of controlling the receiver for a first, relatively short, period of time to detect radio transmissions in a predetermined frequency band may enable the receiver to obtain gross time and frequency synchronization. The scanning step of controlling the receiver for a subsequent second relatively longer period of time is used to receive data (the Access Code) from a subsequent radio packet in the predetermined frequency band. The gross time and frequency synchronization may be used to initiate the scanning step at an optimal frequency.

According to another embodiment of the invention there is provided a radio receiver device comprising: radio receiver circuitry; a clock; and control circuitry for controlling the radio receiver circuitry during a first, relatively short, period of time to detect radio transmissions in a predetermined frequency band and for controlling whether the radio receiver circuitry attempts, during a subsequent second relatively longer period of time, to receive data from a subsequent radio transmission in the predetermined frequency band.

According to another embodiment of the invention there is provided a chip-set for a radio receiver comprising: control circuitry for controlling radio receiver circuitry during a first, relatively short, period of time to detect radio transmissions in a predetermined frequency band and for controlling whether the radio receiver circuitry attempts, during a subsequent second relatively longer period of time, to receive data from a subsequent radio transmission in the predetermined frequency band.

According to another embodiment of the invention there is provided a computer program comprising computer program instructions which when loaded into a processor provide control circuitry for controlling radio receiver circuitry during a first, relatively short, period of time to detect radio transmissions in a predetermined frequency band and for controlling whether the radio receiver attempts, during a subsequent second relatively longer period of time, to receive data from a subsequent radio transmission in the predetermined frequency band.

According to another embodiment of the invention there is provided a method of receiving data at a low power radio receiver comprising: controlling the radio receiver to perform fast frequency hopping for a first relatively short period of time to detect radio transmissions in a predetermined frequency band, and determining whether to control the radio receiver to receive for a subsequent, second relatively longer period of time.

According to another embodiment of the invention there is provided a method of controlling a radio receiver comprising: controlling the radio receiver for a first, relatively short, period of time to detect radio transmissions in a predetermined frequency band and thereby obtain gross time and frequency synchronization, and controlling the radio receiver for a subsequent second relatively longer period of time to receive data from a subsequent radio transmission in the predetermined frequency band and thereby obtain exact time and frequency synchronization.

According to another embodiment of the invention there is provided a method of scanning in a low power radio receiver comprising activating the receiver in a first mode in which the receiver is periodically switched on for a relatively short period of time to detect RF activity in a predetermined frequency band, and, in response to detection of RF activity, activating the receiver in a second mode in which the receiver is periodically switched on for a relatively longer period of time to receive RF signals in the frequency band.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
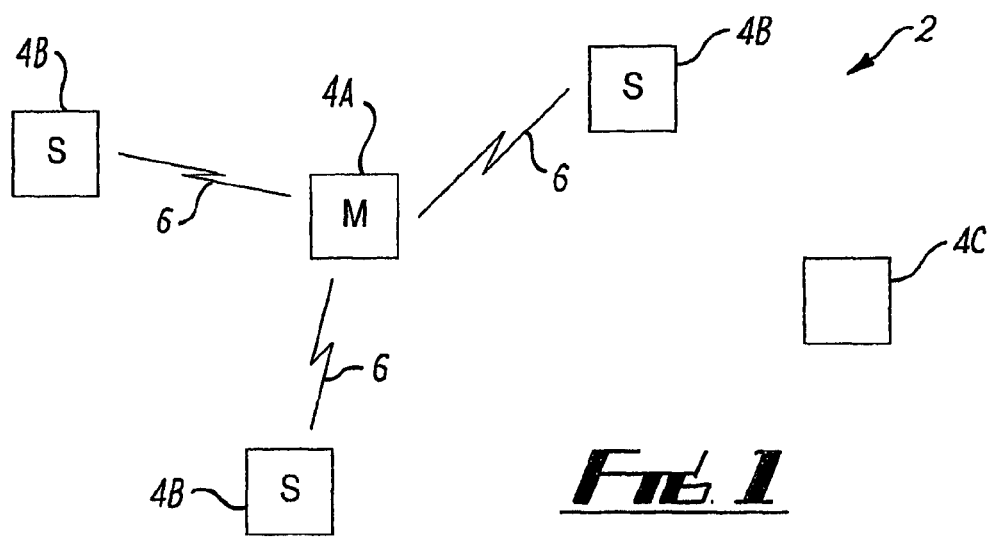
FIG. 1 illustrates a Bluetooth piconet.
Figure 2:
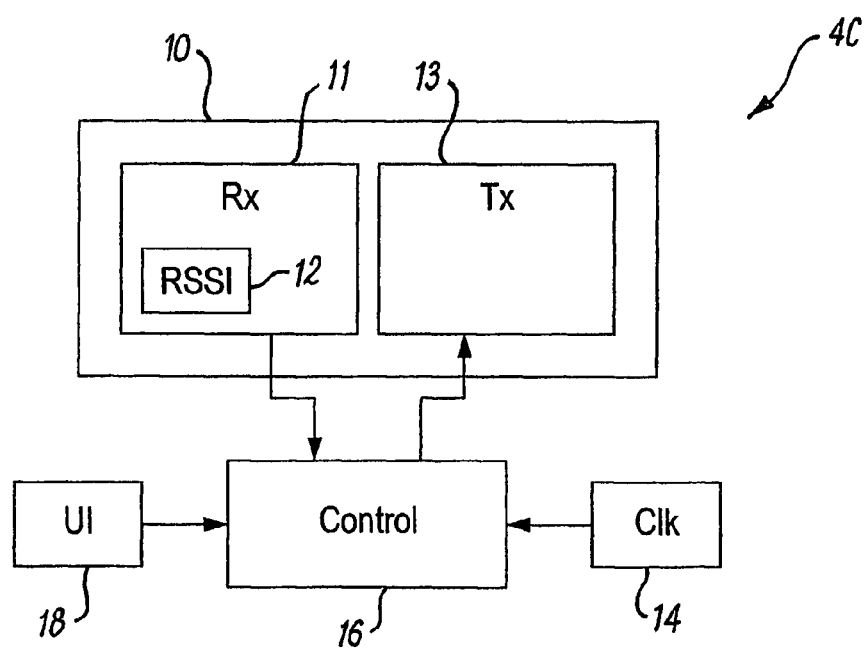
FIG. 2 illustrates a connectable Bluetooth device 4C that is operable to perform conditional scanning.

FIG. 2 illustrates a connectable Bluetooth device 4C that is operable to perform conditional scanning.

It should be appreciated that although this device is capable of joining and participating in a piconet 2 as a Slave it may also be capable of separately forming a piconet in which it would operate as Master.

The device 4C comprises radio transceiver circuitry 10 including radio receiver circuitry 11 and radio transmitter circuitry 13; received signal strength indication (RSSI) measurement circuitry 12 associated with the radio receiver circuitry 11; a clock 14; control circuitry 16, which may be, for example, a microprocessor and memory combination or a chip set; and a user input interface 18. The control circuitry 16 receives an input from the receiver circuitry 11 & RSSI measurement circuitry 12, an input from the user interface 18 and an input from the clock 14. The control circuitry 16 provides an output to the transmitter circuitry 13.

Figure 3A:
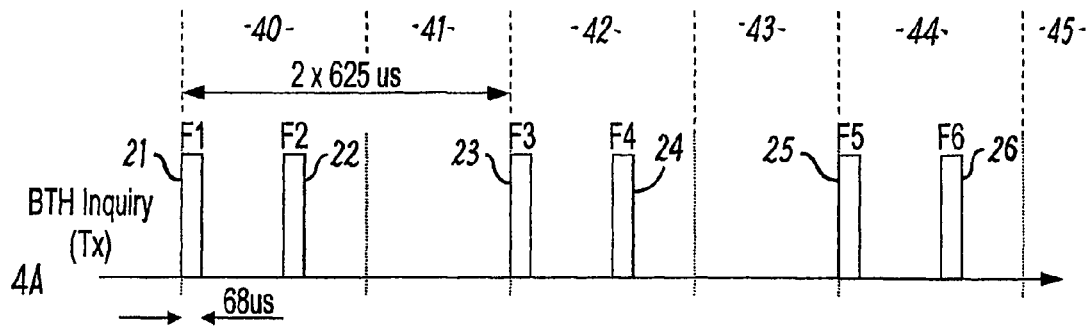
FIG. 3A illustrates transmissions made in the ISM band when the inquiring device 4A is performing the inquiry procedure.

FIG. 3A illustrates transmissions made in the ISM band when the inquiring device 4A is performing the inquiry procedure. The time axis extends from left to right. The inquiry device 4C transmits a series of inquiry packets (ID packets) 21, 22, 23 . . . 26. Each inquiry packet 21-26 has a duration of 68 μs and is transmitted at a different frequency F1-F6. The frequencies used are determined by the inquiry frequency-hopping sequence and lie within the ISM frequency band. Pairs of inquiry packets are transmitted in each of the even numbered slots 40, 42, 44. The odd numbered slots 41, 43, 45 are used for reception by the inquiring device 4A. The pairs of inquiry requests in a slot are separated by half a slot (312.5 μs). Thus the maximum separation between adjacent inquiry packets in the series is 1.5 slots (937.5 μs).

Figure 3B:
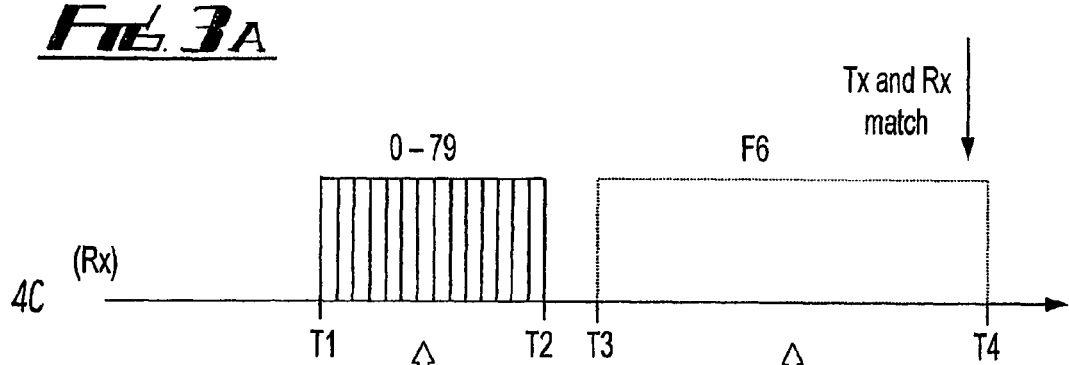
FIG. 3B illustrates, using the same time axis as FIG. 3a, the operation of receiving circuitry in a connectable device.

FIG. 3B illustrates, using the same time axis as FIG. 3a, the operation of the receiving circuitry 11 in the connectable device-4C. At time T1, the connectable device 4C begins to sniff the ISM band and continues to sniff the ISM band until time T2. The control circuitry 16 enables sniffing of the ISM band by controlling the receiver circuitry 11 to detect radio transmissions at each of the 79 channel frequencies in the ISM band.

The ISM frequency band (2402-2481 MHz) includes 79 Bluetooth 1 MHz channels. The connectable device 4C sequentially tries to detect transmissions in each of the channels i.e. sniffs each of the channels for transmissions. The inquiry packet has a duration of 68 μs.

In a preferred implementation, the connectable device preferably sniffs each of the 79 frequency channels during a 68 μs window. The receiving frequency at the connectable device 4C therefore hops at 79/68 million hops per second. However, this window may coincide with a period where the inquiring device 4A is not transmitting. As the inquiring device 4A and the connectable device 4C are not synchronized, the connectable device 4C has no knowledge of if or when the inquiry packets are transmitted. Therefore the cycling through of the 79 hop frequencies is repeated a number of times between T1 and T2. In the example illustrated, it is repeated 14 times, so that the first period of time has a duration of 14*68 μs i.e. 952 μs. The first period of time is thus greater than the maximum separation between adjacent inquiry packets (937.5 μs). The first period of time will consequently coincide with one, possibly two, transmitted inquiry packets if an inquiry procedure is on-going during the first period of time. In the illustrated example, the radio receiver circuitry 11 will detect a radio transmission corresponding to the inquiry packet 23 which is transmitted at frequency F3.

In other implementations, the connectable device preferably sniffs each of the 79 frequency channels over a window greater than 68 μs. The receiving frequency at the connectable device 4C may therefore hop at less than 1 million hops per second. The cycling through of the 79 hop frequencies is repeated a number of times between T1 and T2 and the first period of time may have a duration greater than 1 ms.

The radio receiver circuitry 11 detects a radio transmission during the first period of time by using the RSSI measurement circuitry 12. The RSSI measurement circuitry measures RSSI on the currently sniffed channel and if the RSSI exceeds a threshold then the RSSI measurement circuitry 12 informs the control circuitry 16. The control circuitry 16 then records the channel frequency and the current clock time. The recorded channel frequency and time provide gross frequency and time synchronization which may be used to set initial conditions for the receiver circuitry 11 if it is to be used in a subsequent second period of time T3-T4.

Although RSSI detection is described other mechanisms for measuring transmitted electromagnetic energy in the received radio channel may be used.

The control circuitry 16 also controls whether the receiver circuitry 11 attempts, during the subsequent second period of time T3-T4, to perform an inquiry scan. The operation of the receiver circuitry 11 during the second period of time is shown using dotted lines as it is conditional i.e. depending upon circumstances the receiver may or may not be used in the second period of time T3-T4 to perform an inquiry scan. Whether the receiver circuitry 11 performs an inquiry scan is dependent upon the results of the transmission detection that has occurred during the first period of time T1-T2.

If an inquiry scan is performed the connectable device 4C attempts during the second period of time T3-T4, to receive an Access Code of a transmitted inquiry packet. The second period of time is between 11.25 ms and 2560 ms. As described previously a sliding correlation window is used to detect the Access Code and its detection establishes exact time and frequency synchronization between the connectable device and the inquiring device. This allows a packet to be subsequently sent from the connectable device to the inquiring device. The frequency used at the receiver during the inquiry scan is a slowly hopping sequence that hops every 1.28 s.

The condition(s) used for controlling the performance of the inquiry scan may be positive or negative. A positive condition, if fulfilled, enables the inquiry scan, whereas a negative condition if fulfilled prevents the inquiry scan. Multiple conditions may be used to control the inquiry scan but must always include a positive condition.

One positive condition is 'if any radio transmissions are detected during the first period of time, then the inquiry scan is performed'. If this condition is used by itself, then if no radio transmissions are detected during the first period of time an inquiry scan is not performed.

Another positive condition is 'if any Bluetooth radio transmissions are detected during the first period of time, then the inquiry scan is performed'. If this condition is used by itself, then if no Bluetooth radio transmissions are detected during the first period of time an inquiry scan is not performed. It may be assumed that a Bluetooth transmission has been detected if there is only one or two radio transmissions detected during the first period of time.

An example of a negative condition is 'if any wideband interference radio transmissions are detected during the first period of time, then the inquiry scan is not performed'. If no wideband interference radio transmissions are detected during the first period of time, then an inquiry scan may be performed. A WLAN network transmits in the ISM frequency band but has a channel bandwidth of 20 MHz. The presence of such wideband interference would result in multiple transmission detections over adjacent frequency bands.

The sniffing of the ISM frequency band over the first period of time is periodically repeated every 2.56 s and if the specified condition(s), concerning detected transmissions during the first period of time, are satisfied then the inquiry scan is performed otherwise it is not performed.

The user interface 18 allows the connectable device 4C to be manually switched between performing unconditional inquiry scanning (as in the prior art) and conditional inquiry scanning as described above.

The user interface 18 may also enable adjustment of one or more of the first period of time, the speed of frequency hopping during the first period of time, and the RSSI threshold used.

Figure 4:
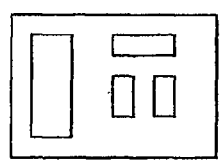
FIG. 4 schematically illustrates a chip-set for a radio receiver.

FIG. 4 schematically illustrates a chip-set for a radio receiver that provides the control circuitry 16. The chip-set comprises control circuitry for controlling receiver circuitry 11 during a first, relatively short, period of time T1-T2 to detect radio transmissions in a predetermined ISM frequency band and for controlling whether the receiver circuitry 11 attempts, during a subsequent second relatively longer period of time T3-T4, to receive data (Inquiry Access Code) from a subsequent radio transmission 26 in the predetermined ISM frequency band.

Figure 5:
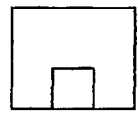
FIG. 5 schematically illustrates a computer readable medium embodying a computer program.

FIG. 5 schematically illustrates a computer readable medium embodying a computer program which when loaded into a processor provides control circuitry controlling receiver circuitry 11 during a first, relatively short, period of time T1-T2 to detect radio transmissions in a predetermined ISM frequency band and for controlling whether the receiver circuitry 11 attempts, during a subsequent second relatively longer period of time T3-T4, to receive data (inquiry access code) from a subsequent radio transmission 26 in the predetermined ISM frequency band.

Although, FIG. 3 illustrates a series of inquiry packets transmitted during an inquiry procedure, it will be realized from the introduction that the Fig is also suitable for illustrating a series of paging requests transmitted during the paging procedure. The above description given in relation to conditional inquiry scanning is also equally applicable to conditional page scanning.

The information concerning the frequency of the radio transmission(s) detected during the first period of time and the time of the detection can be used to set the initial conditions for the subsequent inquiry scan or page scan.

For an inquiry scan, for example, it is assumed that the detected packet 23 is an inquiry packet sent at a frequency from an inquiry frequency-hopping sequence derived from the General Inquiry Access Code (GIAC). The recorded frequency of detection F3 is used to determine the phase of the inquiring device within the sequence at the time of detection. The phase of the inquiring device within the sequence at a future time e.g. T3 can be determined from the recorded time of detection and hence the frequency of transmission F4 used by the inquiring device at the future time T3 can be determined. Thus an inquiry scan can be initiated at the determined frequency F4 at that future time T3.

For a page scan, for example, it is assumed that the detected packet 23 is an page request sent at a frequency from the page frequency-hopping sequence derived from the Bluetooth Device Address of the connectable device. The recorded frequency of detection F3 is used to determine the phase of the paging device within the sequence at the time of detection. The phase of the paging device within the sequence at a future time T3 can be determined from the recorded time of detection and hence the frequency of transmission F4 used by the paging device at the future time T3 can be determined. Thus a page scan can be initiated at the determined frequency F4 at that future time T3.

Alternatively, for an inquiry scan, it is assumed that the detected packet is an inquiry packet sent at a frequency from an inquiry frequency-hopping sequence derived from the General Inquiry Access Code (GIAC). The recorded frequency of detection is used to determine whether the inquiring device is using train A or train B. An inquiry scan can be initiated using the determined train of frequencies.

Without the use of this invention, a Bluetooth device in idle state turns on its transceiver circuitry 10 to perform a page scan and an inquiry scan every 1.28 or 2.56 seconds. The page scan and the inquiry scan each last a minimum of 11.25 ms. Therefore the transceiver is switched on twice for a minimum of 11.25 ms every 2.56 seconds. That is the radio transceiver 10 is on for a minimum of 0.88% of the time. By contrast, in the described embodiment of the invention sniffing occurs for 938 μs every 1.28 or 2.56 seconds. This corresponds to the transceiver being on for 0.037% of the time. This corresponds to a 96% reduction in transceiver circuitry on-time.

Although embodiments of the present invention have been described in the preceding paragraphs with reference to various examples, it should be appreciated that modifications to the examples given can be made without departing from the scope of the invention as claimed. For example, although the invention has been described in relation to Bluetooth it may have application in other radio communication technologies.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
controlling a radio receiver to detect one or more radio transmissions in a predetermined frequency band for a first period of time while the radio receiver is unsynchronized with a network controlled by a further radio receiver; and
determining whether to control the radio receiver for a subsequent second period of time to receive data to allow the radio receiver to switch from being unsynchronized with the network controlled by the further radio receiver to being synchronized with the network controlled by the further radio receiver from a subsequent radio transmission in the predetermined frequency band, wherein the first period of time is shorter than the second period of time;
wherein detecting the one or more radio transmissions in the first period of time provides gross frequency and time synchronization that is used to set initial conditions for the radio receiver at the beginning of the second period of time; and
wherein the gross frequency and time synchronization provides for an initiation of scanning at an optimal frequency by using a frequency of detection and a time of detection of the further radio receiver to determine a frequency of transmission used by the further radio receiver at the beginning of the second period of time, and to initiate the scanning at the determined frequency of transmission at the beginning of the second period of time.

2. A method as claimed in claim 1, wherein controlling the radio receiver for the first period of time involves enabling fast hopping of a receiving frequency at the radio receiver over the first period of time.

3. A method as claimed in claim 2, wherein the predetermined frequency band comprises a plurality of separate frequency channels, wherein the fast hopping hops through the plurality of separate frequency channels at least once during the first period of time.

4. A method as claimed in claim 2, wherein the subsequent radio transmission is a radio packet of predetermined length corresponding to the first period of time, wherein during the first period of time the fast hopping hops through all the channels of the predetermined frequency band in a period of time corresponding to the predetermined length.

5. A method as claimed in claim 2, wherein the fast hopping hops at a rate greater than 1 million hops per second.

6. A method as claimed in claim 1, wherein the first period of time is less than 1 ms.

7. A method as claimed in claim 1, further comprising controlling the radio receiver for the subsequent, second period of time to receive data to allow the radio receiver to switch from being unsynchronized with the network controlled by the further radio receiver to being synchronized with the network controlled by the further radio receiver from the subsequent radio transmission in the predetermined frequency band.

8. A method as claimed in claim 7, wherein the radio receiver is unsynchronized to the source of the radio transmission received during the second period of time.

9. A method as claimed in claim 7, wherein the received data is used for identifying a received data packet.

10. A method as claimed in claim 9, wherein the received data is an Access Code.

11. A method as claimed in claim 10, further comprising identification of the received data packet by correlating the Access Code against an expected Access Code.

12. A method as claimed in claim 11, wherein the correlation establishes synchronization.

13. A method as claimed in claim 1, wherein enabling the radio receiver for the subsequent, second period of time involves using a slowly hopping receiving frequency at the radio receiver.

14. A method as claimed in claim 13, wherein the second period of time is greater than 10 ms.

15. A method as claimed in claim 13, wherein the slowly hopping receiving frequency hops more slowly than once per second.

16. A method as claimed in claim 1, wherein the step of controlling the radio receiver for the first period of time to detect one or more radio transmissions in a predetermined frequency band occurs periodically at least once every 2.56 s.

17. A method as claimed in claim 1, wherein the step of controlling the radio receiver to detect one or more radio transmissions in a predetermined frequency band for the first period of time comprises received signal strength indication detection.

18. A method as claimed in claim 1, wherein the radio receiver is controlled for the subsequent, second period of time to receive data from a subsequent radio transmission in the predetermined frequency band if radio transmissions are detected during the first period of time.

19. A method as claimed in claim 1, wherein the radio receiver is controlled for the subsequent, second period of time to receive data from a subsequent radio transmission in the predetermined frequency band if the one or more radio transmissions detected in the first period of time correspond to a paging or inquiry procedure.

20. A method as claimed in claim 1, wherein the radio receiver is not controlled for the subsequent, second period of time to receive data from a subsequent radio transmission in the predetermined frequency band if the one or more radio transmissions detected in the first period of time correspond to broadband radio transmissions.

21. A method as claimed in claim 1, wherein determining whether to control the radio receiver for the subsequent second period of time comprises determining whether to control the radio receiver to perform a page scan or an inquiry scan.

22. A method as claimed in claim 1, wherein the data is for creating a new network connection with the radio receiver as a slave device in the new network connection.

23. A radio receiver comprising:
radio receiver circuitry;
a clock; and
control circuitry configured for:
controlling the radio receiver circuitry to detect one or more radio transmissions in a predetermined frequency band during a first period of time while the radio receiver circuitry is unsynchronized with a network controlled by a further radio receiver; and controlling whether the radio receiver circuitry attempts, during a subsequent second period of time, to receive data to allow the radio receiver circuitry to switch from being unsynchronized with the network controlled by the further radio receiver device to being synchronized with the network controlled by the further radio receiver from a subsequent radio transmission in the predetermined frequency band, wherein the first period of time is shorter than the second period of time;

wherein detecting the one or more radio transmissions in the first period of time provides gross frequency and time synchronization that is used to set initial conditions for the radio receiver circuitry at the beginning of the second period of time; and wherein the gross frequency and time synchronization provides for an initiation of scanning at an optimal frequency by using a frequency of detection and a time of detection of the further radio receiver to determine a frequency of transmission used by the further radio receiver at the beginning of the second period of time, and to initiate the scanning at the determined frequency of transmission at the beginning of the second period of time.

24. An apparatus comprising:

at least one processor;

and at least one memory including computer program code, the at least one memory and the computer program code configured to, with the at least one processor, cause the apparatus at least to perform:

controlling a radio receiver to detect one or more radio transmissions in a predetermined frequency band for a first period of time while the radio receiver is unsynchronized with a network controlled by a further apparatus; and determining whether to control the radio receiver for a subsequent second period of time to receive data to allow the radio receiver to switch from being unsynchronized with the network controlled by the further apparatus to being synchronized with the network controlled by the further apparatus from a subsequent radio transmission in the predetermined frequency band, wherein the first period of time is shorter than the second period of time;

wherein detecting the one or more radio transmissions in the first period of time provides gross frequency and time synchronization that is used to set initial conditions for the radio receiver at the beginning of the second period of time; and wherein the gross frequency and time synchronization provides for an initiation of scanning at an optimal frequency by using a frequency of detection and a time of detection of the further radio receiver to determine a frequency of transmission used by the further radio receiver at the beginning of the second period of time, and to initiate the scanning at the determined frequency of transmission at the beginning of the second period of time.

25. A non-transitory computer readable medium embodying a computer program comprising computer program instructions which when loaded into a processor provide control circuitry for controlling a radio receiver to perform:

detecting one or more radio transmissions in a predetermined frequency band during a first period of time while the radio receiver is unsynchronized with a network controlled by a further device; and controlling whether the radio receiver attempts, during a subsequent second period of time, to receive data to allow the radio receiver to switch from being unsynchronized with the network controlled by the further device to being synchronized with the network controlled by the further device from a subsequent radio transmission in the predetermined frequency band, wherein the first period of time is shorter than the second period of time;

wherein detecting the one or more radio transmissions in the first period of time provides gross frequency and time synchronization that is used to set initial conditions for the radio receiver at the beginning of the second period of time; and wherein the gross frequency and time synchronization provides for an initiation of scanning at an optimal frequency by using a frequency of detection and a time of detection of the further radio receiver to determine a frequency of transmission used by the further radio receiver at the beginning of the second period of time, and to initiate the scanning at the determined frequency of transmission at the beginning of the second period of time.

26. A method of controlling a radio receiver comprising:

controlling the radio receiver to perform fast frequency hopping for a first period of time to detect one or more radio transmissions in a predetermined frequency band while the radio receiver is unsynchronized with a network controlled by a further radio receiver, and determining whether to control the radio receiver to receive data to allow the radio receiver to switch from being unsynchronized with the network controlled by the further radio receiver to being synchronized with the network controlled by the further radio receiver for a subsequent, second period of time; wherein the first period of time is shorter than the second period of time;

wherein detecting the one or more radio transmissions in the first period of time provides gross frequency and time synchronization that is used to set initial conditions for the radio receiver at the beginning of the second period of time; and wherein the gross frequency and time synchronization provides for an initiation of scanning at an optimal frequency by using a frequency of detection and a time of detection of the further radio receiver to determine a frequency of transmission used by the further radio receiver at the beginning of the second period of time, and to initiate the scanning at the determined frequency of transmission at the beginning of the second period of time.

27. A method of controlling a radio receiver comprising:

controlling the radio receiver to detect one or more radio transmissions in a predetermined frequency band for a first period of time while the radio receiver is unsynchronized with a further radio receiver and thereby obtain gross time and frequency synchronization with the further radio receiver, and;

controlling the radio receiver for a subsequent second period of time to receive data to allow the radio receiver to switch from being unsynchronized with the further radio receiver to being synchronized with the further radio receiver from a subsequent radio transmission in the predetermined frequency band and thereby obtain exact time and frequency synchronization with the further radio receiver, wherein the first period of time is shorter than the second period of time; wherein detecting the one or more radio transmissions in the first period of time provides gross frequency and time synchronization that is used to set initial conditions for the radio receiver at the beginning of the second period of time; and wherein the gross frequency and time synchronization provides for an initiation of scanning at an optimal frequency by using a frequency of detection and a time of detection of the further radio receiver to determine a frequency of transmission used by the further radio receiver at the beginning of the second period of time, and to initiate the scanning at the determined frequency of transmission at the beginning of the second period of time.

28. A method of scanning in a low power radio receiver comprising:

activating the low power radio receiver in a first mode in which the low power radio receiver is periodically switched on for a first period of time to detect RF activity in a predetermined frequency band while the low power radio receiver is unsynchronized with a network controlled by a further low power radio receiver; and in response to detection of RF activity, activating the low power radio receiver in a second mode in which the receiver is periodically switched on for a second period of time to receive RF signals in the predetermined frequency band to allow the low power radio receiver to switch from being unsynchronized with the network controlled by the further low power radio receiver to being synchronized with the network controlled by the further low power radio receiver;

wherein the first period of time is shorter than the second period of time;

wherein detecting the RF activity in the first period of time provides gross frequency and time synchronization that is used to set initial conditions for the low power radio receiver at the beginning of the second period of time; and wherein the gross frequency and time synchronization provides for an initiation of scanning at an optimal frequency by using a frequency of detection and a time of detection of the further radio receiver to determine a frequency of transmission used by the further radio receiver at the beginning of the second period of time, and to initiate the scanning at the determined frequency of transmission at the beginning of the second period of time.

\* \* \* \* \*